United States Patent
Islam et al.

(10) Patent No.: US 11,072,086 B2
(45) Date of Patent: Jul. 27, 2021

(54) WOOD PIGMENT COMPOSITIONS AND WOOD TREATMENT PROCESSES

(71) Applicant: Koppers Performance Chemicals Inc., Pittsburgh, PA (US)

(72) Inventors: Md Sayful Islam, Griffin, GA (US); Jun Zhang, Peachtree City, GA (US)

(73) Assignee: KOPPERS PERFORMANCE CHEMICALS INC., Pittsburgh, PA (US)

( * ) Notice: Subject to any disclaimer, the term of this patent is extended or adjusted under 35 U.S.C. 154(b) by 0 days.

(21) Appl. No.: 16/103,387

(22) Filed: Aug. 14, 2018

(65) Prior Publication Data

US 2019/0099913 A1 Apr. 4, 2019

Related U.S. Application Data

(60) Provisional application No. 62/545,831, filed on Aug. 15, 2017.

(51) Int. Cl.
*B27K 5/00* (2006.01)
*B27K 5/02* (2006.01)
(Continued)

(52) U.S. Cl.
CPC ............... *B27K 5/02* (2013.01); *B27K 3/005* (2013.01); *B27K 3/007* (2013.01); *B27K 3/0278* (2013.01);
(Continued)

(58) Field of Classification Search
CPC ... B27K 5/02; B27K 3/52; B27K 3/08; B27K 3/0278; B27K 3/005; B27K 3/16;
(Continued)

(56) References Cited

U.S. PATENT DOCUMENTS

| | | | |
|---|---|---|---|
| 2005/0165893 A1* | 7/2005 | Feinberg | G06F 11/3438 709/205 |
| 2005/0265893 A1* | 12/2005 | Leach | A01N 25/12 422/40 |

(Continued)

FOREIGN PATENT DOCUMENTS

| | | |
|---|---|---|
| GB | 1139620 A | 1/1969 |
| WO | WO-2005114078 A2 | 12/2005 |
| WO | WO-2009143001 A2 | 11/2009 |

OTHER PUBLICATIONS

International Search Report and Written Opinion of the International Searching Authority, dated Nov. 28, 2018, issued in PCT/US2018/046632.

(Continued)

*Primary Examiner* — Eisa B Elhilo
(74) *Attorney, Agent, or Firm* — K&L Gates LLP

(57) ABSTRACT

Disclosed herein are compositions and methods for treating wood to give it a desirable color that is durable over time, while at the same time rendering the wood resistant to fungal decay and insect attack. The wood may be pressure treated in a two-step process whereby the wood is first treated with a wood preservation composition, and then treated with a composition comprising pigments, or vice versa. Alternatively, the wood may be simultaneously treated with a composition comprising a wood preservative and a composition comprising pigments.

13 Claims, 2 Drawing Sheets

Coniferous Wood Anatomy

(51) Int. Cl.
*B27K 3/00* (2006.01)
*C09D 15/00* (2006.01)
*C09C 1/00* (2006.01)
*B27K 3/22* (2006.01)
*B27K 3/52* (2006.01)
*B27K 3/26* (2006.01)
*B27K 3/02* (2006.01)
*B27K 3/08* (2006.01)
*B27K 3/34* (2006.01)

(52) U.S. Cl.
CPC .............. *B27K 3/08* (2013.01); *B27K 3/22* (2013.01); *B27K 3/26* (2013.01); *B27K 3/343* (2013.01); *B27K 3/52* (2013.01); *B27K 5/00* (2013.01); *C09C 1/0084* (2013.01); *C09D 15/00* (2013.01); *B27K 2240/90* (2013.01)

(58) Field of Classification Search
CPC ......... B27K 3/22; B27K 3/007; B27K 5/007; C09D 15/00; C09D 17/001; C09D 17/008; C09C 1/0084
USPC .......................................................... 8/402
See application file for complete search history.

(56) References Cited

U.S. PATENT DOCUMENTS

| | | | |
|---|---|---|---|
| 2006/0048675 A1* | 3/2006 | Krusemann | B27K 5/02 106/401 |
| 2006/0147632 A1* | 7/2006 | Zhang | B27K 5/02 427/297 |
| 2007/0037001 A1* | 2/2007 | Gao | C09D 191/06 428/541 |
| 2007/0131136 A1* | 6/2007 | Zhang | A61K 31/33 106/15.05 |
| 2008/0160288 A1* | 7/2008 | Kingma | B27K 3/007 428/326 |
| 2010/0048787 A1* | 2/2010 | Shapiro | B27K 3/15 524/376 |
| 2015/0140326 A1* | 5/2015 | Leach | B27K 3/15 428/338 |
| 2016/0083593 A1 | 3/2016 | Marauska et al. | |

OTHER PUBLICATIONS

International Search Report and Written Opinion of the International Searching Authority, dated Oct. 17, 2018, issued in PCT/US2018/029891.

* cited by examiner

Coniferous Wood Anatomy

Bordered Pit

WOOD PIGMENT COMPOSITIONS AND WOOD TREATMENT PROCESSES

The instant application claims priority to U.S. Provisional Application Ser. No. 62/545,831 filed on Aug. 15, 2017, the disclosure in which is hereby incorporated by reference in its entirety. All patents, printed publications and references cited herein are hereby incorporated by reference in their entireties.

FIELD OF THE INVENTION

The field of the invention relates to wood pigment compositions, methods of treating wood using the pigment compositions, and wood treated with the compositions.

BACKGROUND

Creating aesthetically desirable wood products with durable color characteristics remains a challenging endeavor in the wood preservation industry. This is because the effects of exposure to the environment, UV radiation, fungal decay and insect attack all have deleterious consequences on the color of wood when it is placed into service. In many cases, wood exposed to these elements will rapidly lose its color and fade. In such cases, faded wood will need to be re-treated while in service to restore desirable color characteristics. For example, wood used on decks usually fades over time, and requires painting to restore color and UV protection. Thus, there remains an unmet need in the industry for methods and compositions that can be used to simultaneously or sequentially treat wood so that it is resistant to fungal decay and insect attack, and also have desirable color characteristics that are stable and durable over time.

SUMMARY OF THE INVENTION

Disclosed herein are methods of treating a wood substrate comprising the steps of: (a) contacting said wood substrate with a wood pigment composition comprising an aqueous composition comprising: (i) solid micronized particles of carbon black; (ii) solid micronized particles of titanium dioxide ($TiO_2$), or solid micronized particles of zinc oxide (ZnO); (iii) a polymeric additive having a glass transition temperature (Tg) of less than about 100° C.; and (iv) a dispersant; wherein said micronized particles of carbon black and said micronized particles of titanium dioxide, or said micronized particles of zinc oxide, have diameters in the range of 0.001 to 25 microns, and the ratio of carbon black to titanium dioxide (or zinc oxide) is between about 1000:1 to about 1:1000 weight/weight (wt/wt); and (b) subjecting said wood substrate to vacuum and/or pressure treatment.

In certain embodiments, the wood substrate is pre-treated with a wood preservative composition using a vacuum and/or pressure impregnation process. In certain embodiments, the contacting step (a) further comprises contacting said wood substrate with a wood preservative composition. In certain embodiments, the wood substrate is post-treated with a wood preservative composition using a vacuum and/or pressure impregnation process.

In certain embodiments, the ratio of carbon black to titanium dioxide (or zinc oxide) is between about 100:1 to 1:100 (wt/wt); or between about 10:1 to 1:10 (wt/wt); or between about 5:1 to about 1:5 (wt/wt); or between about 2:1 to about 1:2 (wt/wt).

In certain embodiments, the solid polymeric additive has a glass transition temperature (Tg) of less than about 100° C., or less than about 80° C., or less than about 50° C.; or less than about 25° C.; or less than about 5° C.; or less than about 0° C.; or less than about −5° C.; or less than about −25° C.

In certain embodiments, said polymeric additive is selected from the group consisting of water-soluble polymers and water-borne dispersions of micron to sub-micron sized polymer particles.

In certain embodiments, said dispersant is selected from the group consisting of ionic surfactants, non-ionic surfactants, and polymers with pigment affinity groups.

In certain embodiments, the wood pigment composition further comprises a wood preservative. In certain embodiments, the wood preservative comprises a metal compound and an organic biocide. In certain embodiments, the metal compound is selected from the group consisting of compounds of copper, zinc, iron, and silver. In certain embodiments, the copper compound is selected from the group consisting of copper metal, copper ethanolamine complexes, copper ammonia complexes, water-soluble alkaline copper complexes, cuprous oxide, cupric oxide, copper hydroxide, copper carbonate, basic copper carbonate, copper oxychloride, copper 8-hydroxyquinolate, copper dimethyldithiocarbamate, copper omadine, copper borate and basic copper borates.

In certain embodiments, the wood pigment composition further comprises one or more UV resistance compounds. In certain embodiments, the wood pigment composition further comprises one or more wetting agents. In certain embodiments, the wood pigment composition further comprises one or more water repellents, such as wax emulsions. In certain embodiments, the wood pigment composition further comprises one or more defoaming agents. In certain embodiments, the wood pigment composition further comprises one or more pigments, such as iron oxides. In certain embodiments, the wood pigment composition further comprises one or more dyes such as basic dyes, acid dyes, direct dyes, and reactive dyes, where dyes can be in different shades, such as red, yellow, black, orange, pink, purple, green, blue, etc.

In certain embodiments, the invention is directed to a wood substrate treated by the methods disclosed herein.

Figure 1:
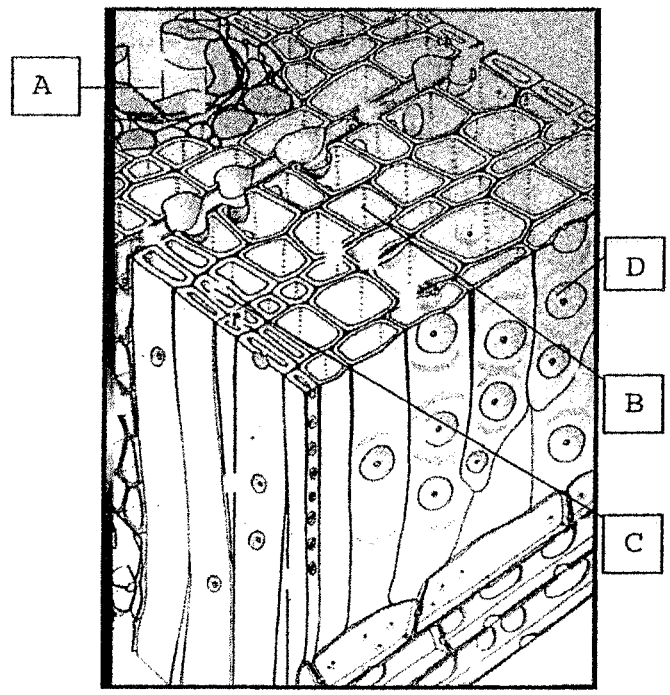
FIG. 1 depicts the anatomy of coniferous wood. A: Resin canal; B: Earlywood tracheids; C: Latewood tracheids; D: Bordered pits.

RIGHT: Microscopic view of the cross section of a bordered pit.

LEFT: Torus in top view. The torus is supported by a net of radial fibril membrane, also called the margo. The flow of fluids between two tracheids through such a membrane is restricted by the size of the membrane openings. A: Pit aperture; B: Torus; C: Margo (microfibrils); D: Pit border.

DETAILED DESCRIPTION

Disclosed herein are gray wood pigment compositions, and methods of treating wood with the gray pigments, to impart to the treated wood desirable color characteristics that are durable over time. The inventors have found that wood treated with the compositions disclosed herein, wherein the compositions comprise a polymer additive with specific characteristics, have stable color characteristics that are durable over time when placed into service and exposed to the environment. The inventors have found that wood treated using the compositions comprising the disclosed polymer additives have the following advantages over current methods and treatment regimens:

Increased color durability when exposed to UV radiation;
Increased color durability when exposed to environmental conditions;
The polymer additive promotes adhesion between the pigments (e.g. carbon black, titanium dioxide, zinc oxide) and wood fibers to reduce rub-off of the pigments from the wood during handling;
Vacuum and/or pressure treated wood using the compositions disclosed herein has a desirable appearance and durable color;
The polymer additive increases UV resistance;
Once the wood is treated according to the invention, there is no need to subsequently paint it because the color is durable.

Prior to the invention disclosed herein, using carbon black as a pigment for use in vacuum and/or pressure treating wood has been extremely challenging because carbon black has very few surface functional groups, making it difficult to stabilize and adhere to wood. Wood treated with carbon black in the absence of the disclosed polymeric additives does not retain the carbon black and it will rub off. The polymer additives disclosed herein solve this problem by promoting adhesion between the carbon black, and other pigments, to the wood fibers thus reducing or eliminating the problem of rub-off and loss of pigment.

In certain embodiments, the compositions comprise a black pigment and a white pigment. The black pigments are selected from a group consisting of carbon black, ivory black, vine black and lamp black. The preferred black pigment is carbon black. Examples of white pigments are titanium dioxide ($TiO_2$), zinc oxide (ZnO), diatomaceous earth, silica, calcium carbonate, barytes, caly, magnesium silicate, lithopone, antimony oxide, and zinc sulfide. The preferred white pigments are $TiO_2$ and ZnO. The carbon black and the titanium dioxide or zinc oxide, are formulated to create compositions that impart to wood desirable shades of gray. By varying the ratio of carbon black to either titanium dioxide or zinc oxide, the shade of gray can be controlled with and without the addition of dyes.

Carbon Black: Carbon black (subtypes are acetylene black, channel black, furnace black, lamp black and thermal black) is a material produced by the incomplete combustion of heavy petroleum products such as FCC tar, coal tar, ethylene cracking tar, and a small amount from vegetable oil. Carbon black is a form of paracrystalline carbon that has a high surface-area-to-volume ratio, albeit lower than that of activated carbon. It is dissimilar to soot in its much higher surface-area-to-volume ratio and significantly lower (negligible and non-bioavailable) PAH (polycyclic aromatic hydrocarbon) content.

Titanium Dioxide: Titanium dioxide can occur in different crystalline forms, such as anatase, rutile, and brookite. Rutile $TiO_2$ pigments are preferred because they scatter light more efficiently, and more stable and durable for exterior applications. Alternative names to titanium dioxide are titanium white, rutile, anatase, brookite, pigment white 6, CT 77891. Commercial available titanium dioxide can have particle size vary from a few tenth of microns to a few dozens of microns. Titanium dioxide particles can also be surface treated with inorganic coatings or organic coatings. Inorganic surface coatings are alumina or silica. Organic surface treatments can enhance the dispensability of TiO2 in aqueous systems.

Zinc Oxide: ZnO is also called zinc white, and it can be derived from the naturally occurring mineral zincite, or it can be chemically synthesized.

Polymeric Additives: The gray pigment formulations disclosed herein are used for pressure treating wood. The formulations may be used alone or in combination with wood preservatives. When the gray pigment formulations and wood preservatives are used together for treating wood, they can not only render wood resistant to fungal decay and insect attack, such as termites, but also impart UV weathering resistance to the treated wood. In the absence of the polymeric additive, the pigment tends to be easily rubbed off during the handling of wood, and the gray color on the treated wood tends to quickly fade once the treated wood is exposed to environmental conditions, i.e. outdoors. However, the inventors have surprisingly found that, when a polymer additive is used in the disclosed compositions, rub-off of the gray pigment treated wood is substantially diminished and even eliminated. The gray color of the treated wood disclosed herein has much better weathering durability.

The polymeric additives disclosed herein may be water-soluble polymers, or water-borne dispersions of micron to sub-micron sized polymer particles. In certain embodiments, the glass transition temperature of the polymer additives disclosed herein is less than about 100° C., or less than about 80° C., or less than about 50° C., or less than about 25° C., or less than about 5° C., or less than about 0° C., or less than about −5° C., or less than about −25° C.

In certain embodiments, the average of molecular weight of the polymer additive is about 1000 to about 10,000 g/mol. In other embodiments, the average molecular weight of the polymer additive is about 10,000 to about 10,000,000 g/mol. In other embodiments, the average molecular weight of the polymer additive is about 10,000 to about 100,000 g/mol. In other embodiments, the average molecular weight of the polymer additive is about 100,000 to about 200,000 g/mol.

The usage level of the polymer additive in the treating solution is generally less than about 20% by weight. In certain embodiments, the usage level of the polymer additive in the treating solution is about 0.01%-10% by weight. In other embodiments, the usage level of the polymer additive in the treating solution is about 0.1% to about 1.0% by weight. In other embodiments, the usage level of the polymer additive is about 0.05% to about 0.5% by weight. In other embodiments, the usage level of the polymer additive is about 0.1% to about 0.3% by weight.

Non-limiting examples of water soluble polymer additives include, but are not limited to, poly(ethylene oxide), polyvinyl alcohol (PVA), polyethylene glycols (PEG), polyamide, polyacrylamide, polyvinyl amine, polyamine, polyacrylics, cellulose ethers, casein, gelatin, xanthan gum, guar gum, carrageenan, and pectin, starches, cellulose derivatives such as carboxymethyl cellulose, hydroxyethyl cellulose and methylcellulose. Preferred soluble polymer additives are PEG, PVA, xanthan gum and cellulose derivatives.

Non-limiting examples of waterborne dispersion of polymer additives include, but are not limited to, polyacrylics, polyacrylate, chlorinated polymers, polyurethane dispersions, alkyd dispersions, meleamine resins, polyamide resins, polyvinyl acetate resin, polyvinyl resin, polybutadiene resin, polyester resin, polyethylene resin, polypropylene resin, rosin esters, silicone resins, epoxy resin, phenol resin, silicone polyesters, polystyrene resin, copolymers of acrylic/ vinyl, polyether/urethane, polyvinyl acetate/ethylene, polystyrene vinyl/toluene, polyvinyl alcohol/formal/butyral, polystyrene/acrylate, polystyrene/butadiene, and polyurethane acrylate. Preferred dispersions of polymer additives are polyacrylics or acrylic copolymer, polystyrene or polystyrene acrylate copolymer, polyurethane acrylate and polyvinyl acetate/ethylene.

Glass Transition Temperature (Tg): The glass-liquid transition, or glass transition for short, is the reversible transition in amorphous materials (or in amorphous regions within semicrystalline materials) from a hard and relatively brittle "glassy" state into a viscous or rubbery state as the temperature is increased. An amorphous solid that exhibits a glass transition is called a glass. The reverse transition, achieved by supercooling a viscous liquid into the glass state, is called vitrification. The glass-transition temperature, Tg, of a material characterizes the range of temperatures over which this glass transition occurs. It is always lower than the melting temperature, Tm, of the crystalline state of the material, if one exists.

Dispersants: A dispersant or a dispersing agent or a plasticizer or a superplasticizer is either a non-surface active polymer or a surface-active substance added to a suspension to improve the separation of particles and to prevent settling or clumping or agglomeration/aggregation. Dispersants consist normally of one or more surfactants, either cationic, anionic or non-ionic. The dispersant may be a polymeric dispersant with a pigment affinity group, such as a hydroxyl group, carboxylic acid group, sulfonate group, amine functional group or quaternary ammonium functional group. The polymeric dispersants may be copolymers. Examples of co-polymer dispersants include, but are not limited to, copolymers with pigment affinity groups, polycarboxylate ethers, modified polyacrylates, acrylic polymer emulsions, modified acrylic polymers, poly carboxylic acid polymers and their salts, modified poly carboxylic acid polymers and their salts, fatty acid modified polyesters, aliphatic polyethers or modified aliphatic polyethers, polyetherphosphates, solutions of polycarboxylate ethers, sodium polyacrylates, sodium polymethacrylates, modified polyether or polyester with pigment affinity groups, fatty acid derivatives, urethane copolymers or modified urethane copolymers, acrylic acid/maleic acid copolymers, polyvinyl pyrrolidones or modified polyvinyl pyrrolidones, modified maleic anhydride/styrene copolymers, lignins and the like.

Examples of commercially available dispersants include, but are not limited to, the Disperbyk dispersant series, such as DISPERBYK 102, 151, 155/50, 156, 180-194, 2010, 2015, P-105, anti-terra 205, anti-terra 250, lactimon-WS, 103, 108, 111, 118, 142, 168, 180, 410, 411, 2008, 2022, 2055, 2152, 2155 and 2164; the Tego Dispersant series, such as TEGO Disperse 650, 652, 653, 656, 660C, 740W, 745W, 747W, 750W, 752W, 755W, 757W, 760W, 761W, 1010, 650, 652, 656, 670, 671, 672, 685, 688, 690 and 710; the EFKA dispersant series, such as EFKA 4510, 4530, 4550, 4560, 4570, 4580, 4585, 4590, 5071, 5220, 5244, 6220, 6225, 6230, 6622, 6W13, 4008, 4009, 4010, 4015, 4020, 4046, 4047, 4050, 4055, 4061, 4063, 4080, 4300, 4310, 4320, 4330, 4340, 4400, 4401, 4402, 4403, 4510, 4530, 4550, 4570. 4590, 5010, 5044, 5054, 5055, 5063, 5065, 5066, 5070, 5071, 5207, 5210, 5215, 5220, 5244, 5744, 6050, 6230, 6220, 6225, 1016, 1101, 1500, 1501, 1502, 1503, 6622, 6700, 6950, 6043, 6745, 6780, 6782, FA 4600, FA 4601, FA 4620, FA 4642, FA 4644, FA 4650, FA 4654, FA 4654EM, FA 4660, FA 4663, FA 4665, FA 4671; and Dispex dispersant series, such as A40, N40V, GA40, G40, and HDN; the Solsperse series, such as Solsperse 3000, 5000S, 8000, 9000, 11200, 13300, 13400, 13650, 13940, 16000, 17000, 17940, 18000, 19000, 21000, and 22000; Dispersants from Stepan Company, such as Bio-softN1-3, Bio-soft N91-2.5, Bio-softN-411, Makon NF-12, and G-3300; AkzoNobel dispersant Phospholan PS 131; the zetasperse series 170, 179, 182, 1200, 2300, 2500, 3100, 3400, 3600, 3700, and 3800 and Carbowet 76, 103, 106, 109, 125, 138, 144, LSF, 422, GA-100, GA-210, GA-211, and GA-221; Clariant dispersant series Dispersogen PCE, PL 30, Pl 40, LFS, ECS, AN200, 4387, polyglykol G 300, polyglykol G500; MunZing dispersant series EDAPLAN 490, 492, 494, 516; petrolite D-1038; Solvay dispersant series Rhodoline 3100, 3500, 3600, 3700, 111.

Inorganic Pigments: Non-limiting examples of inorganic pigments include: iron oxides, including red iron oxides, yellow iron oxides, black iron oxides and brown iron oxides; carbon black, iron hydroxide, graphite, black micaceous iron oxide; aluminum flake pigments, pearlescent pigments; calcium carbonate; calcium phosphate; calcium oxide; calcium hydroxide; bismuth oxide; bismuth hydroxide; bismuth carbonate; copper carbonate; copper hydroxide; basic copper carbonate; silicon oxide; zinc carbonate; barium carbonate; barium hydroxide; strontium carbonate; zinc oxide; zinc phosphate; zinc chromate; barium chromate; chrome oxide; titanium dioxide; zinc sulfide and antimony oxide.

Organic Pigments: Non-limiting examples of organic pigments include Monoazo (arylide) pigments such as PY3, PY65, PY73, PY74, PY97 and PY98; Disazo (diarylide); Disazo condensation; Benzimidazolone; Beta Naphthol; Naphthol; metal-organic complexes; Isoindoline and Isoindolinone; Quinacridone; perylene; perinone; anthraquinone; diketo-pyrrolo pyrrole; dioxazine; triacrylcarbonium; the phthalocyanine pigments, such as cobalt phthalocyanine, copper phthalocyanine, copper semichloro- or monochlorophthalocyanine, copper phthalocyanine, metal-free phthalocyanine, copper polychlorophthalocyanine, etc.; organic azo compounds; organic nitro compounds; polycyclic compounds, such as phthalocyanine pigments, quinacridone pigments, perylene and perinone pigments; diketopyrrolopyrrole (DPP) pigments; thioindigo pigments; dioxazine pigments; quinophthalone pigments; triacrylcarbonium pigments, and Diaryl pyrrolopyroles, such as PR254.

Non-limiting examples of organic pigments, grouped according to the color they produce (e.g. blues, blacks, greens, yellow, reds and browns), based on their color index include: Pigment Yellows 11, 3, 12, 13, 14, 17, 81, 83, 65, 73, 74, 75, 97, 111, 120, 151, 154, 175, 181, 194, 93, 94, 95, 128, 166, 129, 153, 109, 110, 173, 139, 185, 138, 108, 24; Pigment Oranges 5, 36, 60, 62, 65, 68, 61, 38, 69, 31, 13, 34, 43, 51, 71, 73; Pigment Reds 3, 4, 171, 175, 176, 185, 208, 2, 5, 12, 23, 112, 146, 170, 48, 57, 60, 68, 144, 166, 214, 220, 221, 242, 122, 192, 202, 207, 209, 123, 149, 178, 179, 190, 224, 177, 168, 216, 226, 254, 255, 264, 270, 272; Pigment Violets 32, 19, 29, 23, 37; Pigment Browns 25, 23; Pigment Blacks 1, 31, 32, 20; Pigment Blues 15, 15:1, 15:2, 15:3, 15:4, 15:6, 16, 60; and Pigment Greens 7, 36.

Dyes: water soluble dyes or dispersible dyes can also be used in combination with the pigment compositions. Non-limiting examples of dyes include basic dye, acid dye, direct dye and reactive dyes. The shades of dye include, but are not-limited to, black, yellow, white, blue, purple, red, green, blue, orange, brown, etc.

Water Repellants: Non-limiting examples of water repellents include paraffin wax, olefin wax, petroleum wax, carnauba wax; polyethylene wax, silicone wax, polypropylene wax, PTFE wax and synthetic wax.

Anti-weathering Agents: Non-limiting examples of anti-weathering agents include pigments such as zinc oxide, zinc sulfide, iron oxide, carbon black, titanium dioxide; UV absorbers such as hydroxyl-substituted benzophenones, hydroxyphenyl benzotriazides, substituted acrylonitriles; UV stabilizers such as hindered amine light stabilizers (HALS); and anti-oxidants such as amines, imidazoles or complex hindered phenolics.

Dimensional Stabilization Agents: Non-limiting examples of dimensional stabilization agents include waxes such as paraffin wax, olefin wax, petroleum wax, carnauba wax, polyethylene wax, silicone wax, polypropylene wax, PTFE wax and synthetic wax, and polymers such as polystyrene, polyethylene, polypropylene, polyvinyl chloride, polyacrylonitrile, polyvinyl acetate, polyester, acrylic polymers, polyamide, polyurethane, phenolic novolacs, phenolic resoles, urea formaldehyde resins, melamine formaldehyde resins, epoxy resins, natural resins such as rosin and rosin esters, hydrocarbon resins, ketone resins, terpene resins, alkyd resins, silicone resins and silicate resins, and other water insoluble polymers.

Fire Retardants: Non-limiting examples of fire retardants are: metal hydroxides such as aluminum trihydroxide and magnesium hydroxide; antimony compounds such as antimony trioxide, antimony pentoxide and calcium antimonite; zinc compounds such as zinc stannate, zinc hydroxyl-stannate, zinc borate, zinc silicate, zinc phosphate, zinc oxide and zinc hydroxide; phosphorous based compounds such as phosphate esters red phosphorus melamine phosphate, zinc phosphate, calcium phosphate, magnesium phosphate and ethylenediamine phosphate; silicate compounds such as calcium silicate, silica, magnesium silicate and zinc silicate; halogenated compounds such as tetra bromo bisphenol A; nitrogen based compounds such as melamine and its salts, melamine borate and polyamides.

Inorganic Biocides: Inorganic metal compounds, many having a degree of biocidal activity, can be used as additives in the compositions of the present invention. Non-limiting examples of such additives include, but are not limited to, compounds of, for example, copper, tin, silver, nickel. For example, non-limiting examples of specific suitably insoluble metal compounds include cuprous oxide, cupric oxide, copper hydroxide, copper carbonate, basic copper carbonate, copper oxychloride, copper 8-hydroxyquinolate, copper dimethyldithiocarbamate, copper omadine, and copper borate. Non-limiting examples of water soluble metal complexes are copper ammonia or ethanolamine or other alkanolamine complexes.

Organic Biocides: Non-limiting examples of organic biocides are the triazole, imidazole or pyrazole compounds.

Triazole or Imidazole Compounds: Examples of triazole and imidazole compounds include, but are not limited to: 1-[[2-(2,4-dichlorophenyl)-1,3-dioxolan-2-yl]methyl]-1H-1,2,4-triazole (azaconazole), 1-[(2RS,4RS:2RS,4SR)-4-bromo-2-(2,4-dichlorophenyl)tetrahydrofurfuryl]-1H-1,2,4-triazole (bromuconazole), (2RS,3RS;2RS,3SR)-2-(4-chlorophenyl)-3-cyclopropyl-1-(1H-1,2,4-triazol-1-yl) butan-2-ol (Cyproconazole), (2RS,3RS)-1-(2,4-dichlorophenyl)-4,4-dimethyl-2-(1H-1,2,4-triazol-1-yl) pentan-3-ol (diclobutrazol), cis-trans-3-chloro-4-[4-methyl-2-(1H-1,2,4-triazol-1-ylmethyl)-1,3-dioxolan-2-yl]phenyl 4-chlorophenyl ether (difenoconazole), (E)-(RS)-1-(2,4-dichlorophenyl)-4,4-dimethyl-2-(1H-1,2,4-triazol-1-yl)pent-1-en-3-ol (diniconazole), (E)-(R)-1-(2,4-dichlorophenyl)-4,4-dimethyl-2-(1H-1,2,4-triazol-1-yl)pent-1-en-3-ol (diniconazole-M), (2RS,3SR)-1-[3-(2-chlorophenyl)-2,3-epoxy-2-(4-fluorophenyl)propyl]-1H-1,2,4-triazole (epoxiconazole), (RS)-1-[2-(2,4-dichlorophenyl)-4-ethyl-1,3-dioxolan-2-ylmethyl]-1H-1,2,4-triazole (etaconazole), (RS)-4-(4-chlorophenyl)-2-phenyl-2-(1H-1,2,4-triazol-1-ylmethyl)butyronitrile (fenbuconazole), 3-(2,4-dichlorophenyl)-6-fluoro-2-(1H-1,2,4-triazol-1-yl) quinazolin-4(3H)-one (fluquinconazole), bis(4-fluorophenyl)(methyl)(1H-1,2,4-triazol-1-ylmethyl)silane (flusilazole), (RS)-2,4'-difluoro-α-(1H-1,2,4-triazol-1-ylmethyl)benzhydryl alcohol (flutriafol), (2RS,5RS;2RS,5SR)-5-(2,4-dichlorophenyl)tetrahydro-5-(1H-1,2,4-triazol-1-ylmethyl)-2-furyl 2,2,2-trifluoroethyl ether (furconazole), (2RS,5RS)-5-(2,4-dichlorophenyl)tetrahydro-5-(1H-1,2,4-triazol-1-ylmethyl)-2-furyl 2,2,2-trifluoroethyl ether (furconazole-cis), (RS)-2-(2,4-dichlorophenyl)-1-(1H-1,2,4-triazol-1-yl)hexan-2-ol (hexaconazole), 4-chlorobenzyl (EZ)-N-(2,4-dichlorophenyl)-2-(1H-1,2,4-triazol-1-yl) thioacetamidate (imibenconazole), (1RS,2SR,5RS;1RS,2SR,5SR)-2-(4-chlorobenzyl)-5-isopropyl-1-(1H-1,2,4-triazol-1-ylmethyl)cyclopentanol (ipconazole), (1RS,5RS;1RS,5SR)-5-(4-chlorobenzyl)-2,2-dimethyl-1-(1H-1,2,4-triazol-1-ylmethyl)cyclopentanol (metconazole), (RS)-2-(4-chlorophenyl)-2-(1H-1,2,4-triazol-1-ylmethyl)hexanenitrile (myclobutanil), (RS)-1-(2,4-dichloro-β-propylphenethyl)-1H-1,2,4-triazole (penconazole), cis-trans-1-[2-(2,4-dichlorophenyl)-4-propyl-1,3-dioxolan-2-ylmethyl]-1H-1,2,4-triazole (propiconazole), (RS)-2-[2-(1-chlorocyclopropyl)-3-(2-chlorophenyl)-2-hydroxypropyl]-2,4-dihydro-1,2,4-triazole-3-thione (prothioconazole), 3-(2,4-dichlorophenyl)-2-(1H-1,2,4-triazol-1-yl)-quinazolin-4(3H)-one (quinconazole), (RS)-2-(4-fluorophenyl)-1-(1H-1,2,4-triazol-1-yl)-3-(trimethylsilyl)propan-2-ol (simeconazole), (RS)-1-p-chlorophenyl-4,4-dimethyl-3-(1H-1,2,4-triazol-1-ylmethyl)pentan-3-ol (tebuconazole), propiconazole, (RS)-2-(2,4-dichlorophenyl)-3-(1H-1,2,4-triazol-1-yl)propyl 1,1,2,2-tetrafluoroethyl ether (tetraconazole), (RS)-1-(4-chlorophenoxy)-3,3-dimethyl-1-(1H-1,2,4-triazol-1-yl) butan-2-one (triadimefon), (1RS,2RS;1RS,2SR)-1-(4-chlorophenoxy)-3,3-dimethyl-1-(1H-1,2,4-triazol-1-yl) butan-2-ol (triadimenol), (RS)-(E)-5-(4-chlorobenzylidene)-2,2-dimethyl-1-(1H-1,2,4-triazol-1-ylmethyl)cyclopentanol (triticonazole), (E)-(RS)-1-(4-chlorophenyl)-4,4-dimethyl-2-(1H-1,2,4-triazol-1-yl)pent-1-en-3-ol (uniconazole), (E)-(S)-1-(4-chlorophenyl)-4,4-dimethyl-2-(1H-1,2,4-triazol-1-yl)pent-1-en-3-ol (uniconazole-P), and 2-(2,4-difluorophenyl)-1-(1H-1,2,4-triazol-1-yl)-3-trimethylsilyl-2-propanol. Other azole compounds include: amisulbrom, bitertanol, fluotrimazole, triazbutil, climbazole, clotrimazole, imazalil, oxpoconazole, prochloraz, triflumizole, azaconazole, simeconazole, and hexaconazole.

Pyrazoles: Examples of pyrazoles include, but are not limited to: benzovindiflupyr; bixafen; fenpyrazamine; fluxapyroxad; furametpyr; isopyrazam; oxathiapiprolin; penflufen; penthiopyrad; pydiflumetofen; pyraclostrobin; pyrametostrobin; pyraoxystrobin; rabenzazole; and sedaxane.

Boron Compounds: Examples of boron compounds include, but are not limited to: water-soluble boron compounds, boric acid, sodium borates, such as sodium tetraborate decahydrate, sodium tetraborate pentahydrate, and disodium octaborate tetrahydrate (DOT), potassium borates. Non-limiting examples of water insoluble boron compounds include metal borate compounds such as calcium borate, borate silicate, aluminum silicate borate hydroxide, silicate borate hydroxide fluoride, hydroxide silicate borate, sodium silicate borate, calcium silicate borate, aluminum borate, boron oxide, magnesium borate, iron borate, copper borate, and zinc borate (borax).

Quaternary Ammonium Compounds: Non-limiting examples are: didecyldimethylammonium chloride; didecyldimethylammonium carbonate/bicarbonate; alkyldimethylbenzylammonium chloride; alkyldimethylbenzylammonium carbonate/bicarbonate; didodecyldimethylammonium chloride; didodecyldimethylammonium carbonate/bicarbonate; didodecyldimethylammonium propionate; N,N-didecyl-N-methyl-poly(oxyethyl)ammonium propionate.

Isothiazolone Compounds: Non-limiting examples are: methylisothiazolinone; 5-chloro-2-methyl-4-isothiazoline-3-one, 2-methyl-4-isothiazoline-3-one, 2-n-octyl-4-isothiazoline-3-one, 4,5-dichloro-2-n-octyl-4-isothiazoline-3-one, 2-ethyl-4-isothiazoline-3-one, 4,5-dichloro-2-cyclohexyl-4-isothiazoline-3-one, 5-chloro-2-ethyl-4-isothiazoline-3-one, 2-octyl-3-isothiazolone, 5-chloro-2-t-octyl-4-isothiazoline-3-one, 1,2-benzisothiazoline-3-one, preferably 5-chloro-2-methyl-4-isothiazoline-3-one, 2-methyl-4-isothiazoline-3-one, 2-n-octyl-4-isothiazoline-3-one, 4,5-dichloro-2-n-octyl-4-isothiazoline-3-one, 1,2-benzisothiazoline-3-one, etc., more preferably 5-chloro-2-methyl-4-isothiazoline-3-one, 2-n-octyl-4-isothiazoline-3-one, 4,5-dichloro-2-n-octyl-4-isothiazoline-3-one, 1,2-benzisothiazoline-3-one, chloromethylisothiazolinone; 4,5-Dichloro-2-n-octyl-3(2H)-isothiazolone; 1,2-benzisothiazolin-3-one.

Pyrethroids: Examples of pyrethroid compounds include, but are not limited to: acrinathrin, allethrin, bioallethrin, barthrin, bifenthrin, bioethanomethrin, cyclethrin, cycloprothrin, cyfluthrin, beta-cyfluthrin, cyhalothrin, gamma-cyhalothrin, lambda-cyhalothrin, cypermethrin, alpha-cypermethrin, beta-cypermethrin, theta-cypermethrin, zeta-cypermethrin, cyphenothrin, deltamethrin, dimefluthrin, dimethrin, empenthrin, fenfluthrin, fenpirithrin, fenpropathrin, fenvalerate, esfenvalerate, flucythrinate, fluvalinate, tau-fluvalinate, furethrin, imiprothrin, metofluthrin, permethrin, biopermethrin, transpermethrin, phenothrin, prallethrin, profluthrin, pyresmethrin, resmethrin, bioresmethrin, cismethrin, tefluthrin, terallethrin, tetramethrin, tralomethrin, transfluthrin, etofenprox, flufenprox, halfenprox, protrifenbute, silafluofen.

Other Biocides: Other biocides include, but are not limited to: idachloprid; fipronil; cyfluthrin; bifenthrin; permethrin; cypermethrin; chlorpyrifos, iodopropynyl butylcarbamate (IPBC); chlorothalonil; 2-(thiocyanatomethylthio) benzothiazole; alkoxylated diamines and carbendazim. Other biocides, such as fungicides, bactericides, and moldicides can also be used in the compositions disclosed herein.

Micronization: The black pigment and the white pigment used in the current invention are micronized or dispersed or milled to the desirable particle size in order to be used for impregnating wood. The black pigment and the white pigment can be micronized/milled/dispersed, separately. Alternatively, both pigments can be milled/dispersed together with the selection of desirable dispersant(s). Micronized particles can be obtained by grinding the solid material, optionally wetted or present as a dispersion, to the desired particle size using a grinding mill. Other participating methods known in the art can also be used, such as high speed, high shear mixing or agitation. The resulting particulate additive can be mixed with water or other aqueous liquid carrier to form a solution of dispersed additive particles. Optionally, the solution can comprise a thickener, such as, for example, a cellulose derivative, as is known in the art. The solution can, optionally, additionally comprise other biocides, organic or inorganic, micronized if desired, to produce a formulation suitable for the preservation of wood and other cellulose-based materials.

The particles are preferably dispersed in a dispersant, such as acrylic copolymers, aqueous solution of copolymers with pigment affinity groups, modified polyacrylate, acrylic polymer emulsions, modified lignin and the like. If desired, a stabilizer as is known in the art can be used.

Particle Size: The penetration of the dispersion formulation into the cellular structure of wood or other cellulose-based material is dependent upon particle size considerations. If the inorganic/organic additive source used in formulating the dispersion formulation disclosed herein has a particle size in excess of 30 microns, the particles may be filtered by the surface of the wood and thus may not be uniformly distributed within the cell and cell wall. As shown in FIG. 1, the primary entry and movement of fluids through wood tissue occurs primarily through the tracheids and border pits. Tracheids have a diameter of about thirty microns. Fluids are transferred between wood cells by means of border pits.

Without desiring to be bound by theory, penetration of the micronized dispersion formulation into wood takes place because particles migrate into or are taken up by tracheids in the wood. FIG. 1 shows the physiological structure of wood. As shown in FIG. 1, the primary entry and movement of fluids through wood tissue occurs primarily through the tracheids and border pits. Fluids are transferred between wood cells by means of border pits. Wood tracheids generally have diameters of around 30 microns, and thus good penetration can be achieved by the use of particles having long axis dimensions ("particle size" which are less than the tracheid diameters of the wood or wood product to be treated). Particles having diameters which are larger than the average diameter of the tracheids will generally not penetrate the wood (i.e., they will be "filtered" by the wood) and may block, or "clog" tracheids from taking in additional particles.

The diameter of the tracheids depends upon many factors, including the identity of the wood. As a general rule, if the additives disclosed herein have a particle size in excess of 25 microns, the particles may be filtered by the surface of the wood and thus may not be uniformly distributed within the cell and cell wall.

Figure 2:
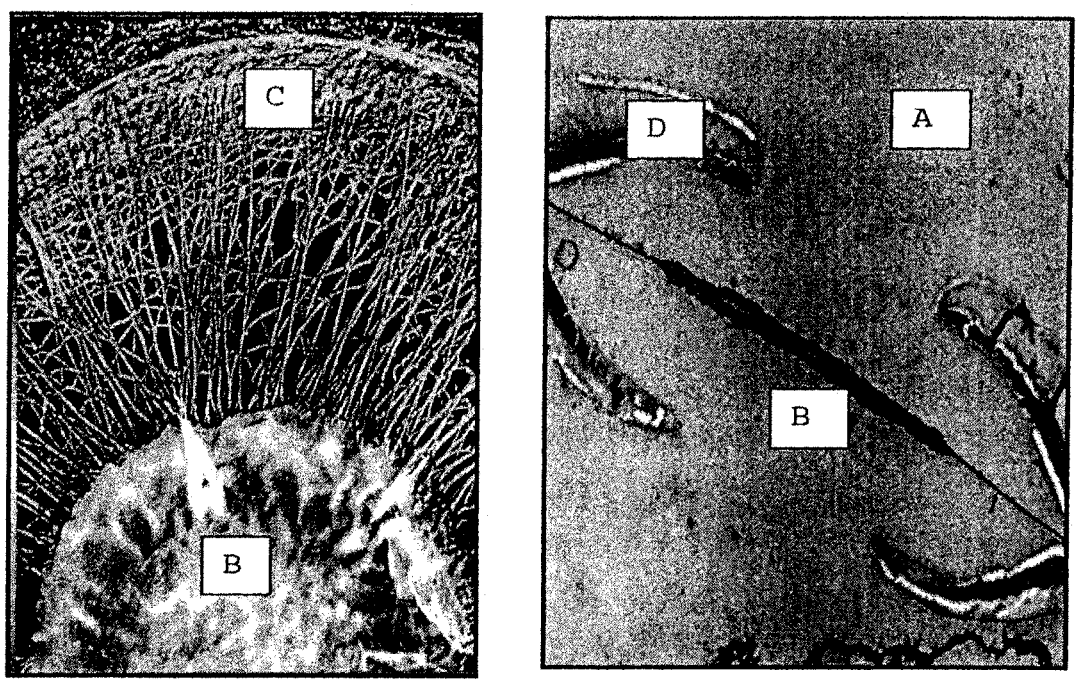
FIG. 2 depicts the border pit structure for coniferous woods.

Studies by Mercury-Porosimetry technique indicated that the overall diameter of the border pit chambers typically varies from a several microns up to thirty microns while, the diameter of the pit openings (via the microfibrils) typically varies from several hundredths of a micron to several microns. FIG. 2 depicts the border pit structure for coniferous woods. Thus, in order to increase penetration and improve the uniformity of distribution of the particulate additive, the particle size should be such that it can travel through the pit openings.

In one embodiment particle size of the micronized particles used in the dispersion formulation disclosed herein can be micronized, i.e., with a long axis dimension between 0.001-25 microns. In another embodiment, the particle size is between 0.001-10 microns. In another embodiment, the particle size is between 0.01 to 10 microns. If superior uniformity of penetration is desired, particle size of the additive used in the dispersion formulation disclosed herein should be between 0.01-1 microns.

In addition to a recommended upper limit of 25 microns, particles which are too small can leach out of the wood over time. It is thus generally recommended that the particulate additive comprise particles which have diameters which are not less than 0.001 microns.

Particles which are too large can clog the wood, preventing it from taking in other particles and particles which are too small can leach from the wood. Thus particle size distributional parameters can affect the uniformity of particle distribution in the wood, as well as the leaching properties of treated wood. It is thus preferable to use particle size distributions which contain relatively few particle sizes outside the range of 0.001 to 25 microns. It is preferred that no more than 20 weight percent of the particles have diameters which are greater than 25 microns. Because smaller particles have an increased chance of leaching from the wood, it is also preferred that no more than 20 wt % of the particles have diameters under 0.001 microns. Regardless of the foregoing recommendations, it is generally preferred that greater than 80 wt % of the particles have a diameter in the range of 0.001 to 25 microns. In more preferred embodiments, greater than 85, 90, 95 or 99 wt percent particles are in the range of 0.001 to 25 microns.

For increased degree of penetration and uniformity of distribution, at least 50 wt % of the particles should have diameters which are less than 10 microns. More preferred are particle distributions which have at least 65 wt % of the particles with sizes of less than 10 microns. In an additional embodiment, less than 20 wt % of the particles have diameters of less than 1 micron.

The present invention also provides a method for preservation of wood. In one embodiment, the method comprises the steps of treating wood with a composition (treating fluid) comprising a dispersion of additive particles. In another embodiment, wood is treated with a composition comprising a dispersion comprised of particles of multiple additives, at least two of said additives having different average particle sizes. The size of the micronized particles of the additives is between 0.001 to 25 microns, preferably between 0.001 to 10 microns, more preferably between 0.01 to 10 microns and most preferably between 0.01 to 1 microns. In another embodiment, the wood is treated with a composition comprising soluble compounds and micronized additives.

The treating fluid may be applied to wood by dipping, soaking, spraying, brushing, or any other means well known in the art. In a preferred embodiment, vacuum and/or pressure techniques are used to impregnate the wood in accord with this invention including the standard processes, such as the "Empty Cell" process, the "Modified Full Cell" process and the "Full Cell" process, and any other vacuum and/or pressure processes which are well known to those skilled in the art.

Pressure Treatment: The standard processes are defined as described in American Wood Protection Association (AWPA) Standard T1-17 "Use Category System: Processing and Treatment Method" or any other vacuum and/or pressure treating process."

Species of Wood Products: Examples of species of wood that may be treated using the disclosed compositions and methods include, but are not limited to: Southern pine, red pine, ponderosa pine, lodegepole pine, western hemlock, Douglas Fir, Western Larch, Pacific Coast Hemlock, Amabilis Fir, White Spruce, Engleman Spruce, Red Spruce, Black Spruce, Jack Pine, Lodgepole Pine, Balsam Fir, Alpine Fir, Western Red Cedar, Red Pine, Ponderosa Pine, Western White Pine, Eastern White Pine, Trembling Aspen, Largetooth Aspen, Balsam Poplar or any other wood species as described in AWPA U1-17: "Use Category System, User Specification for Treated Wood".

Unless stated otherwise, such as in the examples, all amounts and numbers used in this specification are intended to be interpreted as modified by the term "about." Likewise, elements or compounds identified in this specification, unless stated otherwise, are intended to be non-limiting and representative of other elements or compounds generally considered by those skilled in the art as being within the same family of elements or compounds.

The following examples are provided to further describe certain embodiments of the disclosure but are in no way limiting to the scope of the disclosure.

EXAMPLES

The main pigment components used in the current composition comprise a black pigment and a white pigment. Examples of black pigments that may be used in the disclosed compositions and methods include, but are not limited to, carbon black, ivory black, vine black or lamp black. The preferred black pigment is carbon black. Examples of white pigments that may be used in the disclosed compositions and methods include, but are not limited to, titanium dioxide ($TiO_2$), zinc oxide (ZnO), diatomaceous earth, silica, calcium carbonate, barytes, caly, magnesium silicate, lithopone, antimony oxide, and zinc sulfide. The preferred white pigments are $TiO_2$ and ZnO. Titanium dioxide can occur in different crystalline forms, such as anatase, rutile, and brookite. Rutile $TiO_2$ pigments are preferred because they scatter light more efficiently, and they are more stable and durable for exterior applications. Alternative names for titanium dioxide are titanium white, rutile, anatase, brookite, pigment white 6, CT 77891. Commercially available titanium dioxide can have a particle size that varies from a few tenths of a micron to a few dozen microns. Titanium dioxide particles can also be surface-treated with inorganic coatings or organic coatings. Inorganic surface coatings include, but are not limited to, alumina or silica. Organic surface treatments can enhance the dispersability of $TiO_2$ in aqueous systems. ZnO is also called zinc white, and it can be derived from the naturally occurring mineral zincite, or it may be chemically synthesized. The black pigment and white pigment disclosed herein may be dispersed and milled to the desirable particle size in order to be used for impregnating wood. The black pigment and the white pigment can be milled/dispersed, separately; or alternatively, both pigments can be milled/dispersed together.

The following examples are merely indicative of the nature of the present invention, and should not be construed as limiting the scope of the invention.

Examples 1-3 and 33 demonstrate the preparation of dispersed black pigment concentrate.

Examples 4-7 and 34 demonstrate the preparation of dispersed white pigment concentrate.

Examples 8-18, 35 and 36 demonstrate the preparation of grey pigment concentrates by mixing the black pigment dispersion and white pigment dispersion at different ratios.

Examples 19-20 demonstrate the preparation of the treating solution containing grey pigments for vacuum/pressure impregnating wood without the addition of a polymer additive with Tg less than 100° C., where treated wood showed pigment rub-offs and poor weathering resistance.

Examples 21-23 demonstrate the preparation of the treating solution containing grey pigments for vacuum/pressure impregnating wood with the addition of a polymer additive with Tg less than 100° C., where the treated wood showed reduced or negligible pigment rub-offs and greater weathering resistance.

Examples 24-25, 37 and 38 demonstrate the preparation of the treating solution containing grey pigments and wood preservatives for vacuum/pressure impregnating wood without the addition of a polymer additive with Tg less than 100° C., where the treated wood showed pigment rub-offs and poor weathering resistance.

Examples 26-28 demonstrate the preparation of the treating solution containing grey pigments and wood preservatives for vacuum/pressure impregnating wood with the addition of a polymer additive with Tg less than 100° C., where the treated wood showed minimal or negligible pigment rub-offs and greater weathering resistance.

Examples 29-30 demonstrate a two-step treating process with pressure impregnating wood with wood preservative first followed by treating with grey pigment treating solution.

Examples 31-32 demonstrate a two-step treating process with pressure impregnating wood with grey pigment treating solution followed by treating with wood preservatives.

Example 1

One thousand (1000) grams of carbon black were added to a container containing 3400 grams water and 600 grams of a commercially available water borne dispersing/wetting agent. The mixture was mechanically stirred for 5 minutes and then placed in a grinding mill. The mixture was ground for about 2 hours, and a stable dispersion containing about 20% carbon black was obtained with an average particles size of 0.450 micrometers.

Example 2

One thousand (1000) grams of carbon black were added to a container containing 3400 grams water and 600 grams of a commercially available water borne dispersing/wetting agent. The mixture was mechanically stirred for 5 minutes and then placed in a grinding mill. The mixture was ground for about 2 hours, and a stable dispersion containing about 20% carbon black was obtained with an average particles size of 0.300 micrometers.

Example 3

Ninety (90.0) grams of carbon black were added to a container containing 306 grams water and 54 grams of a commercially available water borne dispersing/wetting agent. The mixture was mechanically stirred for 5 minutes and then placed in a grinding mill. The mixture was ground for about 2 hours, and a stable dispersion containing about 20% carbon black was obtained with an average particles size of 0.150 micrometers.

Example 4

Three hundred (300.0) grams of titanium dioxide were added to a container containing 170 grams water and 30 grams of a commercially available water borne dispersing/wetting agent. The mixture was mechanically stirred for 5 minutes and then placed in a grinding mill. The mixture was ground for 20 minutes, and a stable dispersion containing about 60% titanium dioxide was obtained with an average particles size of 1.0 micrometers.

Example 5

Three hundred (300.0) grams of titanium dioxide were added to a container containing 170 grams water and 30 grams of a commercially available water borne dispersing/wetting agent. The mixture was mechanically stirred for 5 minutes and then placed in a grinding mill. The mixture was ground for 40 minutes, and a stable dispersion containing about 60% titanium dioxide was obtained with an average particles size of 0.600 micrometers.

Example 6

Three thousand (3000.0) grams of titanium dioxide were added to a container containing 1700 grams water and 300 grams of a commercially available water borne dispersing/wetting agent. The mixture was mechanically stirred for 5 minutes and then placed in a grinding mill. The mixture was ground for an hour, and a stable dispersion containing about 60% titanium dioxide was obtained with an average particles size of 0.360 micrometers.

Example 7

Three thousand (3000.0) grams of titanium dioxide were added to a container containing 1700 grams water and 300 grams of a commercially available water borne dispersing/wetting agent. The mixture was mechanically stirred for 5 minutes and then placed in a grinding mill. The mixture was ground for an hour, and a stable dispersion containing about 60% titanium dioxide was obtained with an average particles size of 0.300 micrometers.

Example 8

A grey pigment concentrate contains 0.48 g of a dispersion made from Example 2 combined with 477.5 g of a dispersion from example 7, and 22 g of water and other pigments and dyes. Mechanically stirring the mixture for 10 minutes produces a stable grey formulation with a carbon black to titanium dioxide ratio of 1:1000 (wt/wt).

Example 9

A grey pigment concentrate contains 4.5 g of dispersion made from Example 2 to 450 g of dispersion from example 7, and 45.5 g of water and other pigments and dyes mixture. Mechanically stirring the mixture for 10 minutes, produce a stable grey formulation with carbon black to titanium dioxide ratio 1:100 (wt/wt).

Example 10

A grey pigment concentrate containing 40 g of the dispersion made as described in Example 3 is combined with 600 g of the dispersion described in Example 7, and 360 g of water and other pigments and dyes. The mixture is mechanically stirred for 10 minutes to produce a stable grey formulation with a carbon black to titanium dioxide ratio of 1:15 (wt/wt).

Example 11

A grey pigment formulation was prepared by adding 40 g of the dispersion made as described in Example 3 to 200 g of the dispersion described in Example 7, and 260 g of water and other pigments and dyes. The mixture was mechanically stirred for 10 minutes and a stable grey pigment concentrate to produce a stable grey formulation with a carbon black to titanium dioxide ratio of 1:5 (wt/wt).

Example 12

A grey pigment formulation was prepared by adding 112.5 g of the dispersion made from Example 3 to 225 g of the dispersion from example 7, and 162.5 g of water and other pigments and dyes. The mixture was mechanically stirred for 10 minutes and a stable pigment grey was formulated with a carbon black to titanium dioxide ratio of 1:2 (wt/wt).

Example 13

A grey pigment formulation contains 225 g of dispersion made from Example 3 to 225 g of dispersion from example 7, and 50 g of water and other pigments and dyes mixture. Mechanically stirring the mixture for 10 minutes, produce a stable grey formulation with carbon black to titanium dioxide ratio 1:1 (wt/wt).

Example 14

A grey pigment formulation was prepared by adding 164.52 g of dispersion from example 7 to 133.02 g of dispersion made from Example 3, and 2.46 g of dyes. The mixture was mechanically stirred for 10 minutes and thus a stable grey concentrate was formulated with carbon black to titanium dioxide ratio 1.25:1 (wt/wt).

Example 15

A grey pigment formulation was prepared by adding 40 g of the dispersion made as described in Example 7 to 200 g of the dispersion described in Example 3, and 260 g of water and other pigments and dyes. The mixture was mechanically stirred for 10 minutes and a stable grey pigment concentrate to produce a stable grey formulation with a carbon black to titanium dioxide ratio of 5:1 (wt/wt).

Example 16

A grey pigment concentrate containing 40 g of the dispersion made as described in Example 7 is combined with 600 g of the dispersion described in Example 3, and 360 g of water and other pigments and dyes. The mixture is mechanically stirred for 10 minutes to produce a stable grey formulation with a carbon black to titanium dioxide ratio of 15:1 (wt/wt).

Example 17

A grey pigment formulation consists of 4.5 g of the dispersion from example 7 and 450 g of the dispersion made from Example 3, and 45.5 g of water and other pigments and dyes. Mechanically stirring the mixture for 10 minutes produces a stable grey formulation with carbon black to titanium dioxide ratio 100:1 (wt/wt).

Example 18

A grey pigment formulation consists of 0.47 g of the dispersion from example 7 and 477.5 g of the dispersion made from Example 3, and 22 g of water and other pigments and dyes. Mechanically stirring the mixture for 10 minutes produces a stable grey formulation with carbon black to titanium dioxide ratio 1000:1 (wt/wt).

Example 19

A treating composition consists of 50 g of the dispersion made from Example 12 and 4950 g of water. The resulting fluid contains about 1% pigment grey by weight. This fluid is then used to treat a 2"×6"×12" Spruce Pine Fir wood using the full-cell process wherein the wood is initially placed under a vacuum of 25-30" Hg for 15 minutes, followed by the addition of treating solution. The system is then pressurized for 60 minutes at 120 psi. A final vacuum of 30" Hg for 15 minutes is applied to the wood to remove residual liquid. The wood has a uniform color distribution, but significant color rub off from surface. In addition, outdoor weathering test and accelerated UV test demonstrate quick color fading after about 2-3 days.

Example 20

A treating composition consists of 125 g of the dispersion made from Example 12 and 4875 g of water. The resulting fluid contain about 2.5% pigment grey by weight. This fluid is then use to treat a 2"×6"×12" Spruce Pine Fir wood using the full-cell process wherein the wood is initially placed under a vacuum of 25-30" Hg for 15 minutes, followed by the addition of treating solution. The system is then pressurized for 60 minutes at 120 psi. A final vacuum of 30" Hg for 15 minutes is applied to the wood to remove residual liquid. The wood has a uniform color distribution, but it has significant color rub off from the wood surface. In addition, outdoor weathering test and accelerated UV test demonstrate quick color fading after about 2-3 days.

Example 21

A treating composition consists of 125 g of the dispersion made from Example 12 and 10 grams of special polymer additive with glass transition temperature (Tg) 55° C. and 4865 g of water. The resulting fluid contains about 2.5% pigment grey by weight. This fluid is then use to treat a 2"×6"×12" Spruce Pine Fir wood using the full-cell process wherein the wood is initially placed under a vacuum of 25-30" Hg for 15 minutes, followed by the addition of treating solution. The system is then pressurized for 60 minutes at 120 psi. A final vacuum of 30" Hg for 15 minutes is applied to the wood to remove residual liquid. The wood has a uniform color distribution with reduced rub off color from the wood surface compared to the treatment completed without the special polymer additive. In addition, outdoor weathering test and accelerated UV test demonstrate moderate color fading resistance.

Example 22

A treating composition consists of 125 g of dispersion made from Example 12 and 10 grams of special polymer additive with glass transition temperature (Tg) 12° C. and 4865 g of water. The resulting fluid contains about 2.5% pigment grey by weight. This fluid is then use to treat a 2"×6"×12" Spruce Pine Fir wood using the full-cell process wherein the wood is initially placed under a vacuum of 25-30" Hg for 15 minutes, followed by the addition of treating solution. The system is then pressurized for 60 minutes at 120 psi. A final vacuum of 30" Hg for 15 minutes is applied to the wood to remove residual liquid. The wood has a uniform color distribution with significantly low rub off of color from the wood surface. In addition, outdoor weathering test and accelerated UV test demonstrate good color fading resistance.

Example 23

A treating composition consists of 125 g of the dispersion made from Example 12 and 10 grams of special polymer additive with a glass transition temperature (Tg) −5° C. and 4865 g of water. The resulting fluid contains about 2.5% pigment grey by weight. This fluid is then used to treat a 2"×6"×12" Spruce Pine Fir wood using the full-cell process wherein the wood is initially placed under a vacuum of 25-30" Hg for 15 minutes, followed by the addition of treating solution. The system is then pressurized for 60 minutes at 120 psi. A final vacuum of 30" Hg for 15 minutes is applied to the wood to remove residual liquid. The wood is found to have a uniform color distribution with no or negligible rub off color from the wood surface. In addition, outdoor weathering test and accelerated UV test demonstrate excellent color fading resistance.

Example 24

A treating solution was prepared by adding 35.72 g of micronized copper azole (MCA) preservative and 50 g of the dispersion made from Example 12 and 4914.28 g of water. The resulting fluid contained about 1% pigment grey by weight. This fluid is then used to treat a 2"×6"×12" Spruce Pine Fir wood using the full-cell process wherein the wood was initially placed under a vacuum of 25-30" Hg for 15 minutes, followed by the addition of treating solution. The system was then pressurized for 60 minutes at 120 psi. A final vacuum of 30" Hg for 15 minutes was applied to the wood to remove residual liquid. The wood was found to have a uniform color distribution, and the treating solution showed good stability with stable particle size. The wood samples were placed outdoors for performance evaluation against fungal, termite, and color weatherability. The results showed that the wood sample left outdoors is protected from wood decay fungi and termites, however, it fades color rapidly.

Example 25

A treating solution was prepared by adding 35.72 g of micronized copper azole (MCA) preservative and 125 g of the dispersion made from Example 12 and 4839.28 g of water. The resulting fluid contained about 2.5% pigment grey by weight. This fluid is then used to treat a 2"×6"×12" Spruce Pine Fir wood using the full-cell process wherein the wood was initially placed under a vacuum of 25-30" Hg for 15 minutes, followed by the addition of treating solution. The system was then pressurized for 60 minutes at 120 psi. A final vacuum of 30" Hg for 15 minutes was applied to the wood to remove residual liquid. The wood was found to have a uniform color distribution, and treating solution showed good stability with stable particle size. The wood samples were placed outdoors for performance evaluation against fungal decay, termites, and color weatherability. The results showed that the wood sample left outdoors is protected from wood decay fungi and termites, however, it fades color rapidly.

Example 26

A treating solution was prepared by adding 35.72 g of micronized copper azole (MCA) preservative, 50 g of the dispersion made from Example 12, 10 g of specialty polymer additive with a glass transition temperature (Tg) 55° C. and 4829.28 g of water. The resulting fluid contained about 2.5% pigment grey by weight. This fluid is then used to treat a 2"×6"×12" Spruce Pine Fir wood using the full-cell process wherein the wood was initially placed under a vacuum of 25-30" Hg for 15 minutes, followed by the addition of treating solution. The system was then pressurized for 60 minutes at 120 psi. A final vacuum of 30" Hg for 15 minutes was applied to the wood to remove residual liquid. The dry wood was found to have a uniform color distribution, and better weatherability at outdoor weathering and accelerating UV test compared to treating fluid lacking the polymer additive, the wood was also protected from wood decay fungi and termites.

Example 27

A treating solution was prepared by adding 35.72 g of micronized copper azole (MCA) preservative, 50 g of the dispersion made from Example 12, 10 g of specialty polymer additive with a glass transition temperature (Tg) of 12° C. and 4829.28 g of water. The resulting fluid contained about 2.5% pigment grey by weight. This fluid is then used to treat a 2"×6"×12" Spruce Pine Fir wood using the full-cell process wherein the wood was initially placed under a vacuum of 25-30" Hg for 15 minutes, followed by the addition of treating solution. The system was then pressurized for 60 minutes at 120 psi. A final vacuum of 30" Hg for 15 minutes was applied to the wood to remove residual liquid. The dry wood was found to have a uniform color distribution, and better weatherability during outdoor weathering and accelerated UV testing and compared to wood treated without the polymer additive. The wood was also protected from wood decay fungi and termites.

Example 28

A treating solution was prepared by adding 35.72 g of micronized copper azole (MCA) preservative, 50 g of dispersion made from Example 12, 10 g of specialty polymer additive with a glass transition temperature (Tg) of −5° C. and 4829.28 g of water. The resulting fluid contained about 2.5% pigment grey by weight. This fluid is then used to treat a 2"×6"×12" Spruce Pine Fir wood using the full-cell process wherein the wood was initially placed under a vacuum of 25-30" Hg for 15 minutes, followed by the addition of treating solution. The system was then pressurized for 60 minutes at 120 psi. A final vacuum of 30" Hg for 15 minutes was applied to the wood to remove residual liquid. The dry wood was found to have a uniform color distribution, and superior weatherability during outdoor weathering and accelerated UV testing compared to wood treated without the polymer additive. The wood was also protected from wood decay fungi and termites.

Example 29

A treating solution consists of 35.72 g of micronized copper azole (MCA) preservative and 4964.28 g of water. This fluid is then use to treat a 2"×6"×12" Spruce Pine Fir wood using the full-cell process wherein the wood is initially placed under a vacuum of 25-30" Hg for 15 minutes, followed by the addition of treating solution. The system is then pressurized for 60 minutes at 120 psi. A final vacuum of 30" Hg for 15 minutes is applied to the wood to remove residual liquid. The same wood is treated as before with a solution containing 125 g of a dispersion made from Example 12 and 10 g of specialty polymer additive with a glass transition temperature (Tg) of 55° C. and 4865 g of water. The resulting fluid contains about 2.5% pigment grey by weight. The dry wood has a uniform color distribution, with reduced color rub off from wood surface compared to wood treated with a pigment solution lacking the specialty polymer additive in the treating solution. These wood samples are protected from wood decay fungi and termites furthermore, outdoor weathering test and accelerated UV test demonstrate considerable color fading resistance.

Example 30

A treating solution consists of 35.72 g of micronized copper azole (MCA) preservative and 4964.28 g of water. This fluid is then use to treat a 2"×6"×12" Spruce Pine Fir wood using the full-cell process wherein the wood is initially placed under a vacuum of 25-30" Hg for 15 minutes, followed by the addition of treating solution. The system is then pressurized for 60 minutes at 120 psi. A final vacuum of 30" Hg for 15 minutes is applied to the wood to remove residual liquid. The same wood is treated as before with a solution containing 125 g of the dispersion made from Example 12 and 10 g of specialty polymer additive with a glass transition temperature (Tg) of −5° C. and 4865 g of water. The resulting fluid contains about 2.5% pigment grey by weight. The wood has a uniform color distribution, with no color rub off from the wood surface. In addition, outdoor weathering test and accelerated UV test demonstrate superior color fading resistance, while protecting from wood decay fungi and termites.

Example 31

A treating solution composition consists of 125 g of the dispersion made from Example 12 and 10 g of specialty polymer additive with a glass transition temperature (Tg) of 55° C. and 4865 g of water. The resulting fluid contains about 2.5% pigment grey by weight. This fluid is then use to treat a 2"×6"×12" Spruce Pine Fir wood using the full-cell process wherein the wood is initially placed under a vacuum of 25-30" Hg for 15 minutes, followed by the addition of treating solution. The system is then pressurized for 60 minutes at 120 psi. A final vacuum of 30" Hg for 15 minutes is applied to the wood to remove residual liquid. The same wood is treated as before with water borne 0.71 wt % MCA treating solution. The wood has a uniform color distribution, with reduced color rub off from the wood surface compared to wood treated with a pigment solution lacking the specialty polymer additive. The wood is protected from wood decay fungi and termites, furthermore, outdoor weathering test and accelerated UV test demonstrate considerable color fading resistance.

Example 32

A treating solution composition consists of 125 g of the dispersion made from Example 12 and 10 g of specialty polymer additive with glass transition temperature (Tg) of −5° C. were added to 4865 g of water. The resulting fluid contains about 2.5% pigment grey by weight. This fluid is then use to treat a 2"×6"×12" Spruce Pine Fir wood using the full-cell process wherein the wood is initially placed under a vacuum of 25-30" Hg for 15 minutes, followed by the addition of treating solution. The system is then pressurized for 60 minutes at 120 psi. A final vacuum of 30" Hg for 15 minutes is applied to the wood to remove residual liquid. Later the same wood is treated as before with water-borne 0.71 wt % MCA treating solution. The wood has a uniform color distribution, with no color rub off from the wood surface. The wood is protected from wood decay fungi and termites, furthermore, outdoor weathering test and accelerated UV test demonstrate superior color fading resistance.

Example 33

Eight hundred (800) grams of carbon black were added to a container containing 2380 grams water and 800 grams of a commercially available water borne dispersing/wetting agent. The mixture was mechanically stirred for 5 minutes and then placed in a grinding mill. The mixture was ground for about 5 hours, and a stable dispersion containing about 20% carbon black was obtained with an average particles size of 0.180 micrometers.

Example 34

Twenty-five hundred (2500.00) grams of titanium dioxide were added to a container containing 2125 grams water and 375 grams of a commercially available water borne dispersing/wetting agent. The mixture was mechanically stirred for 5 minutes and then placed in a grinding mill. The mixture was ground for an hour, and a stable dispersion containing about 50% titanium dioxide was obtained with an average particles size of 0.300 micrometers.

Example 35

A grey pigment formulation was prepared by adding 80.6 g of dispersion made from Example 3 to 403 g of dispersion from example 7, and 136.4 g of water and other pigments and dyes. The mixture was mechanically stirred for 10 minutes, produces a stable grey formulation with carbon black to titanium dioxide ratio 1:15 (wt/wt).

Example 36

A grey pigment formulation was prepared by adding 32.8 g of the dispersion made from Example 3 to 54.7 g of the dispersion from example 7, and 94.8 g of water and other pigments and dyes. The mixture was mechanically stirred for 10 minutes and a stable grey pigment concentrate was formulated with a carbon black to titanium dioxide ratio of 1:5 (wt/wt).

Example 37

A treating solution was prepared by adding 422.14 g of micronized copper azole (MCA) preservative and 619.99 g of the dispersion made from Example 12 and 15949 g of water. The resulting fluid contained about 3.65% pigment grey by weight. This fluid is then used to treat a 2"×6"×12" Spruce Pine Fir wood using the full-cell process wherein the wood was initially placed under a vacuum of 25-30" Hg for 15 minutes, followed by the addition of treating solution. The system was then pressurized for 60 minutes at 120 psi. A final vacuum of 30" Hg for 15 minutes was applied to the wood to remove residual liquid. The wood was found to have a uniform color distribution, and the treating solution showed good stability with stable particle size. The wood samples were placed outdoors for performance evaluation against fungal, termite, and color weatherability. The results showed that the wood sample left outdoors is protected from wood decay fungi and termites, however, it fades color rapidly.

Example 38

A treating solution was prepared by adding 446.97 g of micronized copper azole (MCA) preservative and 820.57 g of the dispersion made from Example 13 and 16722.85 g of water. The resulting fluid contained about 4.56% pigment grey by weight. This fluid is then used to treat a 2"×6"×12" Spruce Pine Fir wood using the full-cell process wherein the wood was initially placed under a vacuum of 25-30" Hg for 15 minutes, followed by the addition of treating solution. The system was then pressurized for 60 minutes at 120 psi. A final vacuum of 30" Hg for 15 minutes was applied to the wood to remove residual liquid. The wood was found to have a uniform color distribution, and treating solution showed good stability with stable particle size. The wood samples were placed outdoors for performance evaluation against fungal decay, termites, and color weatherability. The results showed that the wood sample left outdoors is protected from wood decay fungi and termites, however, it fades color rapidly.

What is claimed is:

1. A method of treating a wood substrate comprising the steps of:
   (a) contacting said wood substrate with a wood pigment composition comprising an aqueous composition comprising:
      (i) solid micronized particles of carbon black;
      (ii) solid micronized particles of titanium dioxide (TiO$_2$);
      (iii) 0.1 to 1% by weight of a polymeric additive having a glass transition temperature (Tg) of less than about 80° C.; and
      (iv) a dispersant;
      wherein said micronized particles of carbon black and said micronized particles of titanium dioxide have diameters in the range of 0.001 to 25 microns, and the ratio of carbon black to titanium dioxide is between about 1000:1 to about 1:1000 (wt/wt);
      wherein the polymeric additive comprises at least one of poly(ethylene oxide), polyvinyl amine, casein, gelatin, xanthan gum, guar gum, carrageenan, pectin, starches, polybutadiene resin, rosin esters, silicone polyesters, and copolymers of polyvinyl acetate/ethylene, polystyrene vinyl/toluene, polyvinyl alcohol/formal/butyral, polystyrene/acrylate, and polystyrene/butadiene; and
   (b) subjecting said wood substrate to pressure treatment.

2. A method of treating a wood substrate comprising the steps of:
   (a) contacting said wood substrate with a wood pigment composition comprising an aqueous composition comprising:
      (i) solid micronized particles of carbon black;
      (ii) solid micronized particles of zinc oxide (ZnO);
      (iii) 0.1 to 1% by weight of a polymeric additive having a glass transition temperature (Tg) of less than about 80° C.; and
      (iv) a dispersant;
      wherein said micronized particles of carbon black and said micronized particles of zinc oxide have diameters in the range of 0.001 to 25 microns, and the ratio of carbon black to zinc oxide is between about 1000:1 to about 1:1000 (wt/wt);
      wherein the polymeric additive comprises at least one of poly(ethylene oxide), polyvinyl amine, casein, gelatin, xanthan gum, guar gum, carrageenan, pectin, starches, polybutadiene resin, rosin esters, silicone polyesters, and copolymers of polyvinyl acetate/ethylene, polystyrene vinyl/toluene, polyvinyl alcohol/formal/butyral, polystyrene/acrylate, and polystyrene/butadiene; and
   (b) subjecting said wood substrate to pressure treatment.

3. A wood substrate treated by the method of claim 2.

4. An aqueous composition comprising:
   (a) solid micronized particles of carbon black;
   (b) solid micronized particles of titanium dioxide (TiO$_2$);
   (c) 0.1 to 1% by weight of a polymeric additive having a glass transition temperature (Tg) of less than about 80° C.; and
   (d) a dispersant;
   wherein said micronized particles of carbon black and said micronized particles of titanium dioxide have diameters in the range of 0.001 to 25 microns, and the ratio of carbon black to titanium dioxide is between about 1000:1 to about 1:1000 (wt/wt);
   wherein the polymeric additive comprises at least one of poly(ethylene oxide), polyvinyl amine, casein, gelatin, xanthan gum, guar gum, carrageenan, pectin, starches, polybutadiene resin, rosin esters, silicone polyesters, and copolymers of polyvinyl acetate/ethylene, polystyrene vinyl/toluene, polyvinyl alcohol/formal/butyral, polystyrene/acrylate, and polystyrene/butadiene.

5. An aqueous composition comprising:
   (a) solid micronized particles of carbon black;
   (b) solid micronized particles of zinc oxide (ZnO);
   (c) 0.1 to 1% by weight of a polymeric additive having a glass transition temperature (Tg) of less than about 80° C.; and
   (d) a dispersant;
   wherein said micronized particles of carbon black and said micronized particles of zinc oxide have diameters in the range of 0.001 to 25 microns, and the ratio of carbon black to zinc oxide is between about 1000:1 to about 1:1000 (wt/wt);
   wherein the polymeric additive comprises at least one of poly(ethylene oxide), polyvinyl amine, casein, gelatin, xanthan gum, guar gum, carrageenan, pectin, starches, polybutadiene resin, rosin esters, silicone polyesters, and copolymers of polyvinyl acetate/ethylene, polystyrene vinyl/toluene, polyvinyl alcohol/formal/butyral, polystyrene/acrylate, and polystyrene/butadiene.

6. The method of claim 1, wherein the polymeric additive has a glass transition temperature (Tg) of no greater than about 55° C.

7. The method of claim 1, wherein the polymeric additive has a glass transition temperature (Tg) of less than about 25° C.

8. The method of claim 1, wherein the polymeric additive has a glass transition temperature (Tg) of less than about 0° C.

9. The method of claim 1, wherein the dispersant is selected from the group consisting of ionic surfactants, non-ionic surfactants, and polymers with pigment affinity groups.

10. The method of claim 1, wherein the wood pigment composition comprises a copper compound.

11. The method of claim 10, wherein the wood pigment composition comprises an organic biocide.

12. The method of claim 1, wherein the wood pigment composition comprises a UV resistance compound.

13. The method of claim 1, wherein the wood pigment composition comprises a range of 0.1% to 0.3% by weight of the polymeric additive.

* * * * *